(12) United States Patent
Bharadwaj

(10) Patent No.: US 8,271,950 B2
(45) Date of Patent: Sep. 18, 2012

(54) TEST GENERATION FROM CAPTURED USER INTERFACE STATUS

(75) Inventor: Anutthara Bharadwaj, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 12/497,847

(22) Filed: Jul. 6, 2009

(65) Prior Publication Data

US 2011/0004868 A1  Jan. 6, 2011

(51) Int. Cl.
*G06F 9/44* (2006.01)
(52) U.S. Cl. ......... 717/124; 717/125; 717/127; 717/131
(58) Field of Classification Search ............... 717/124, 717/125, 127, 131
See application file for complete search history.

(56) References Cited

U.S. PATENT DOCUMENTS

| | | | |
|---|---|---|---|
| 5,542,043 A | 7/1996 | Cohen et al. | |
| 5,754,760 A | 5/1998 | Warfield | |
| 6,002,869 A * | 12/1999 | Hinckley | 717/124 |
| 2008/0028364 A1 | 1/2008 | Triou et al. | |
| 2008/0294941 A1 | 11/2008 | Copstein et al. | |

OTHER PUBLICATIONS

Miao, et al. "An FSM based GUI Test Automation Model", 2010, IEEE, p. 120-126.*

Memon, at al., "Using GUI Run-Time State as Feedback to Generate Test Cases", Retrieved at <<http://ieeexplore.ieee.org//stamp/stamp.jsp?tp=&arnumber=04222601>>, 29th International Conference on Software Engineering (ICSE'07), 2007 IEEE, pp. 10.
"Testing SOA Applications with IBM Rational Quality Management Solutions", Retrieved at <<ftp://ftp.software.ibm.com/software/rational/web/whitepapers/10708268_Testing_SOA_WP_acc.pdf>>, May 2007, pp. 1-12.
Memon, et al., "Automatically Testing "Nightly/Daily Builds" of GUI Applications", Retrieved at <<http://www.cs.umd.edu/—atif/papers/MemonDSN2003.pdf>>, pp. 2.
Robinson Harry, "Graph Theory Techniques in Model-Based Testing", Retrieved at <<http://www.geocities.com/harry_robinson_testing/graph_theory.htm>>, Presented at the 1999 International Conference on Testing Computer Software, pp. 1-15.
Kundu, et al., "A Novel Approach to Generate Test Cases from UML Activity Diagrams", Retrieved at <<http://www.jot.fm/issues/issue_2009_05/artlce1.pdf>>, Journal of Object Technology, vol. 8, No. 3, May-Jun. 2009, pp. 65-83.
"Model-Based Testing", Retrieved at <<https://www.goldpractices.com/practices/mbt/index.php>>, May 20, 2009, pp. 1-35.

* cited by examiner

*Primary Examiner* — Qamrun Nahar
(74) *Attorney, Agent, or Firm* — Ogilvie Law Firm

(57) ABSTRACT

Recorded user actions are combined with captured program status information to automatically generate test sequences which provide greater test coverage than a mere replayed script. A finite state machine is automatically constructed, based on the captured program status information and on user action groups specified by a tester. Test sequences based on the finite state machine are automatically built and executed, to exercise the program being tested.

18 Claims, 5 Drawing Sheets

LOGIN
Select 'fareast\anutthar' in 'Username:' combo box
Type '{Tab}' in 'User name:' text box
Type '********' in 'Password:' text box

BOOK TICKET
Click 'Services' link
Mose hover 'Services' link at (32, 9)
Click '/WorkplaceServices/Travel' link
Click 'U.S. & Canada Travel' link
Click 'Book through Travelport' link Click 'Home' link

BUY A COMPUTER
Click 'Personal Purchasing' link
Click 'Buy a computer' link
Click '/atg/microsoft' link
Click 'rightColumn' tabel cell Click 'Home' link

BUY A COMPUTER
Click 'Employee' link
Click 'EmployeeMatters/PersonalPurchasing' link
Click 'Buy a computer' link
Click '/atg/microsoft' link
Click 'aspnetForm' custom control

Fig. 4

```
<< STATE 1 >>
```
LOGIN
Select 'fareast\anutthar' in 'Username:' combo box
Type '{Tab}' in 'User name:' text box
Type '********' in 'Password:' text box
```
<< STATE 2 >>
```

---

```
<< STATE 3 >>
```
BOOK TICKET
Click 'Services' link
Mose hover 'Services' link at (32, 9)
Click '/WorkplaceServices/Travel' link
Click 'U.S. & Canada Travel' link
Click 'Book through Travelport' link
```
<< STATE 4 >>
```

---

```
<< STATE 5 >>
```
BUY A COMPUTER
Click 'Personal Purchasing' link
Click 'Buy a computer' link
Click '/atg/microsoft' link
Click 'rightColumn' tabel cell
```
<< STATE 6 >>
```

---

STATE 1: username_combobox enabled
STATE 2: 'Services' link enabled; 'Personal Purchasing' link enabled; username_combobox disabled
STATE 3: 'Services' link enabled
STATE 4: username_combobox enabled; 'Personal Purchasing' link enabled; 'Services' link enabled
STATE 5: 'Personal Purchasing' link enabled
STATE 6: username_combobox disabled; 'Personal Purchasing' link disabled; 'Services' link disabled

Fig. 5

TEST GENERATION FROM CAPTURED USER INTERFACE STATUS

BACKGROUND

Software programs can be tested in various ways. Under beta testing, for example, a program is distributed to beta users who exercise the program and report errors they find. However, use by even a large number of beta users will not necessarily disclose a majority of the errors in a program, because beta testing does not systematically exercise the various aspects of a given program. Script automation systems test programs by running scripts. Test scripts can be hand-crafted by directly typing them in, or by recording tester actions, for example. Programs can also be tested by being exercised directly by a tester or a developer. However, the tester or developer may be focused on a particular feature of a program, or may be focused on program actions that are meant to accomplish a particular user task, so test coverage may be limited. Program testing can be both labor intensive and incomplete. Some testing approaches rely on hand-crafted (manually created) tests, which do not necessarily provide broad coverage of all program features, and which may be difficult to adapt as the program changes.

SUMMARY

Users interact with a program through actions such as making menu selections, entering text, using a mouse, and so on. User actions can be automatically recorded, and then played back to repeat the interaction by executing the actions again within the program. However, recorded user actions can be used as more than a mere script to be played back later. Recorded actions can also be combined with other information to automatically generate test sequences which provide far greater test coverage than a mere replayed script would give. Some embodiments described herein transform user actions within a program into a testing automation finite state machine. User actions taken as a user interacts with a program through user interface hardware are automatically recorded. In addition, program status information before and after the user actions is automatically captured, such as the status of a set of interactable controls of a user interface of the program; "interactable controls" are program controls a user can interact with through the user interface. A human-readable listing of the recorded user actions is output, allowing a user to specify an action grouping which places user actions in groups suited for testing, e.g., user actions directed to buying a ticket could be grouped together to aid testing of program functionality for ticket purchases. A finite state machine based on the captured program status information and on the specified user action groups is automatically constructed. Test sequences based on the finite state machine can then be automatically built to exercise the program well beyond the extent of the recorded sequence. For instance, a recorded sequence that ends with the user logging out can help form a basis for an automatically built test sequence that tests whether a user can improperly access program features after logging out.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is part of an example, showing a recorded sequence of user actions, annotated to show logical action groups;

FIG. 5 is an action grouping continuing the example of FIG. 4, annotated to show finite machine states for test generation;

DETAILED DESCRIPTION

Overview

Figure 1:
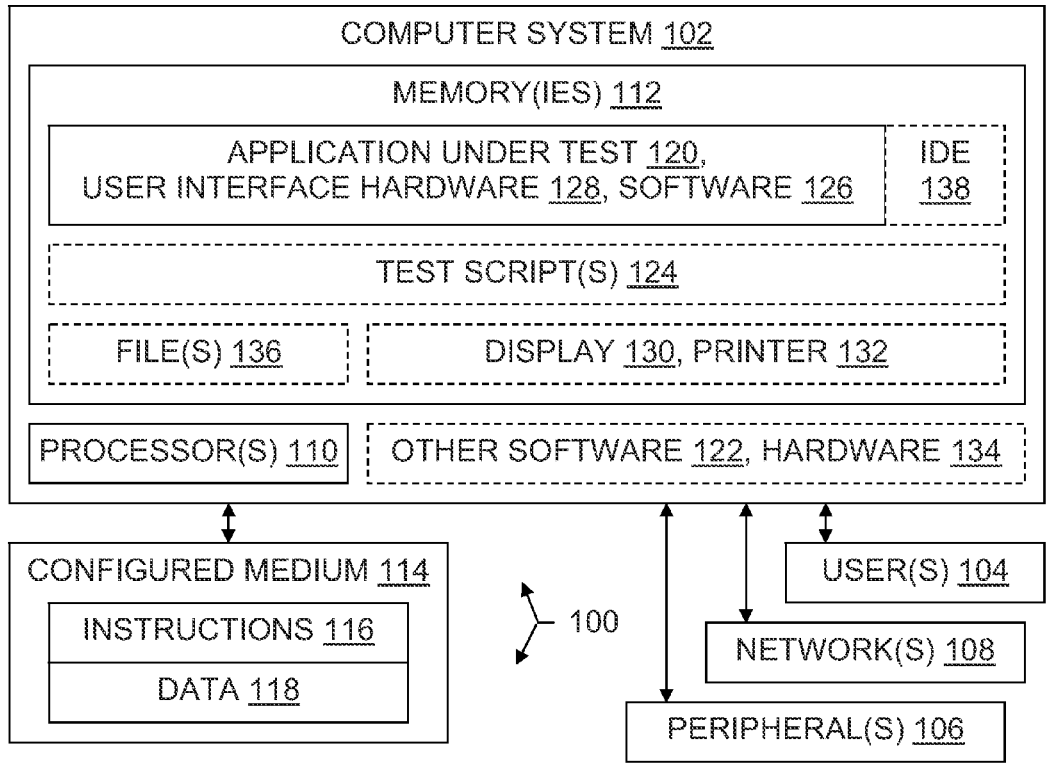
FIG. 1 is a block diagram illustrating a computer system having at least one processor, at least one memory, at least one application to be tested, and other items in an operating environment which may be present on multiple network nodes, and also illustrating configured storage medium embodiments.

Testing applications with graphical user interfaces (GUIs) can be difficult. Such testing may be broadly divided into two categories, namely, end-to-end scenario testing, and targeted testing on the user interface (UI) only. Testers may focus on end-to-end user scenarios to determine whether an application is working as desired.

However, user flows may not be exhaustively defined in a specification which guides testing. Indeed, control flows possible in an application often go beyond those expressly stated in the application's specification and other design documents. Testing may attempt to find bugs in the control flows that are not expressly stated in the specification, but testing which covers even a small portion of all control flows may need to be extensive. Such testing can be done by manual testers, but is often very tedious, resulting in decreased chances of bug discovery. The cost of one alternative, UI automation, is often prohibitive. Another alternative, model-based testing, attempts to scientifically determine what control flows are possible on a given application. However, modeling is a highly specialized activity which requires expertise and familiarity with the code base; manual testers engaged in testing an application typically will not have modeling expertise or familiarity with the code base.

Some embodiments described herein provide an alternative testing technology, which can be used alone or in addition to other types of testing. A test sequencer can combine the power of model-based testing and exploratory testing with the ease of automation to automatically generate a new set of test cases that explore the application, after the tester has performed a basic user scenario that follows an end-to-end user flow. In some embodiments, a testing tool automatically models the system under test by capturing application status at user-defined logical checkpoints and then creating a set of test cases that can be automatically executed. This can result in greater coverage of the application along many (if not all) valid paths, without substantial manual effort.

Some embodiments provide automatic and transparent state capture of an application at logical checkpoints while testing a system. Some provide automatic generation of a finite state machine, e.g., a state graph, modeling the system's behavior without a user having to input any data explicitly about the system. Some provide automatic execution and generation of test cases by traversing the state graph, thereby exploring the application effectively.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to the inventor's own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "state(s)" means "one or more states" or equivalently "at least one state".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, testers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. The media 112 may be volatile memory, non-volatile memory, fixed in place media, removable media, magnetic media, optical media, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as user images, user actions, product characteristics, inventories, physical measurements, settings, images, readings, targets, volumes, and so forth. Such data is also transformed by as discussed herein, e.g., by grouping, status checkpoint marking, finite state/transition defining, altered sequencing, execution, modification, display, creation, loading, and/or other operations.

Media 112 may be of different physical types. One or more applications 120 under test, other software 122, and other items shown in the Figures may reside partially or entirely within one or more media 112, thereby configuring those media. For instance, the application may be driven by test scripts 124, and may have user interface software 126, such as a graphical user interface ("GUI") and/or a command-line interpreter interface. The application may also effectively include user interface hardware 128, shown for convenience in the same box as the application 120 even though the user interface hardware is not necessarily limited to memory 112. User interface hardware 128 may include peripherals 106 such as a mouse, keyboard, display 130, printer 132, and so on. An operating environment may also include other hardware 134, such as buses, power supplies, and accelerators, for instance. Memory 112 may be configured for storage and retrieval of files 136.

A given operating environment 100 may include an Integrated Development Environment (IDE) 138 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the fields of software development and software testing.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
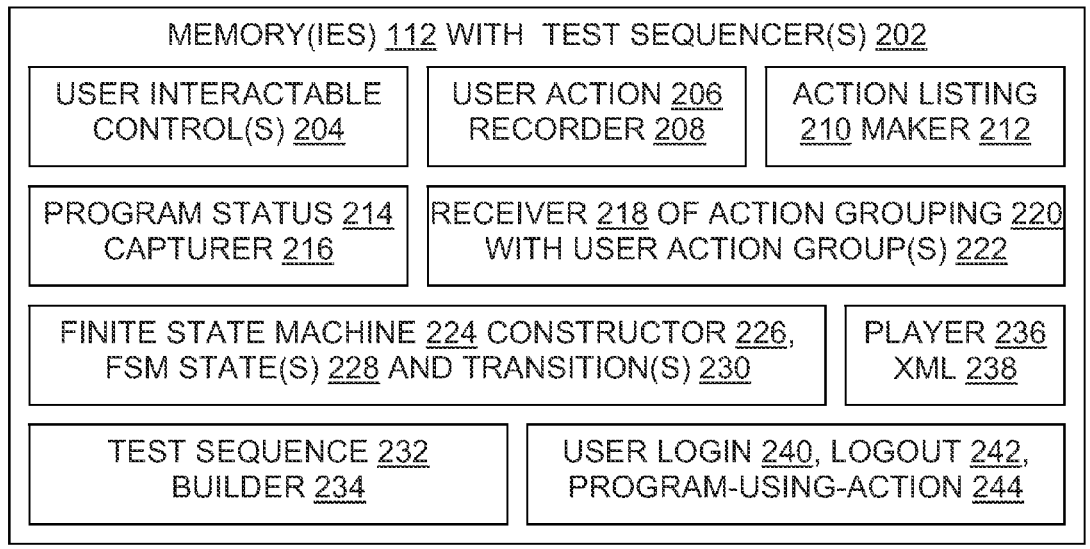
FIG. 2 is a block diagram illustrating an example architecture for test generation from captured user interface status information.

FIG. 2 illustrates an architecture which is suitable for use with some embodiments. A test sequencer 202 provides tools and techniques for test generation from captured user interface status information.

In this example, the application 120 being tested includes user interactable controls 204. For example, some applications include GUI objects as controls 204 implementing menus, windows, sliders, radio buttons, mouse- or tablet-controlled cursors, text boxes, and other user interface controls with which a user can interact.

In this example, user actions 206 in the application's user interface are recorded by a recorder 208, such as a recorder of the kind used to record test scripts 124 for playback. The recorder may output a human-readable textual action listing 210, or a separate listing maker 212 may transform the recording of user actions 206 from the recorder's action recording format into a human-readable textual action listing 210 suitable for output to a display 130 and/or a printer 132.

In this example, the user interactable controls 204 have an application program interface ("API") which provides a test sequencer status capturer 216 with program status 214 information, e.g., which radio button is chosen, which check boxes are checked, whether text has been entered in a text box, and so on. Thus, the application 120 (like the overall system 102), includes hardware configured with software for operation as described herein.

In this example, the human-readable textual action listing 210 is provided to a human tester, who responds by inputting to an action grouping receiver 218 an action grouping 220 which specifies user action groups 222. An action group 222 is a logical set of user actions, such as logging in, checking messages, doing a search, making a purchase, and so on, depending on the particular type of application 120 being tested and the tester's selection of activity granularity, for instance.

In this example, the captured program status 214 and the action grouping 220 are used by a constructor 226 to construct a finite state machine 224 ("FSM"). States 228 of the FSM correspond to user action groups, and transitions 230 between states occur when program status 214 at the end of one action group 222 matches adequately with program status 214 at the beginning of another action group 222. Criteria for adequate matches are discussed later below.

In this example, the finite state machine 224 encodes a variety of test sequences 232, which are built from the FSM by a builder 234 that traverses the FSM. Test sequences, and the recorded sequence, can be played by a player 236 to exercise the application. Test sequences can be encoded in XML 238 or another format, stored in files or otherwise configuring memory, for example.

In this example, one test sequence 232 replicates the recorded sequence of user actions, whereas other test sequences 232 present user actions in different orders and/or different frequencies than they appear in the recorded sequence. For instance, assume that a recorded sequence includes user actions to login 240 to the application 120 being tested, to logout 242 from that application, and to perform some program-using-action 244 while logged in. A test sequence 232 could include login 240 to the application 120, logout 242, and a program-using-action 244 after logging out.

Figure 3:
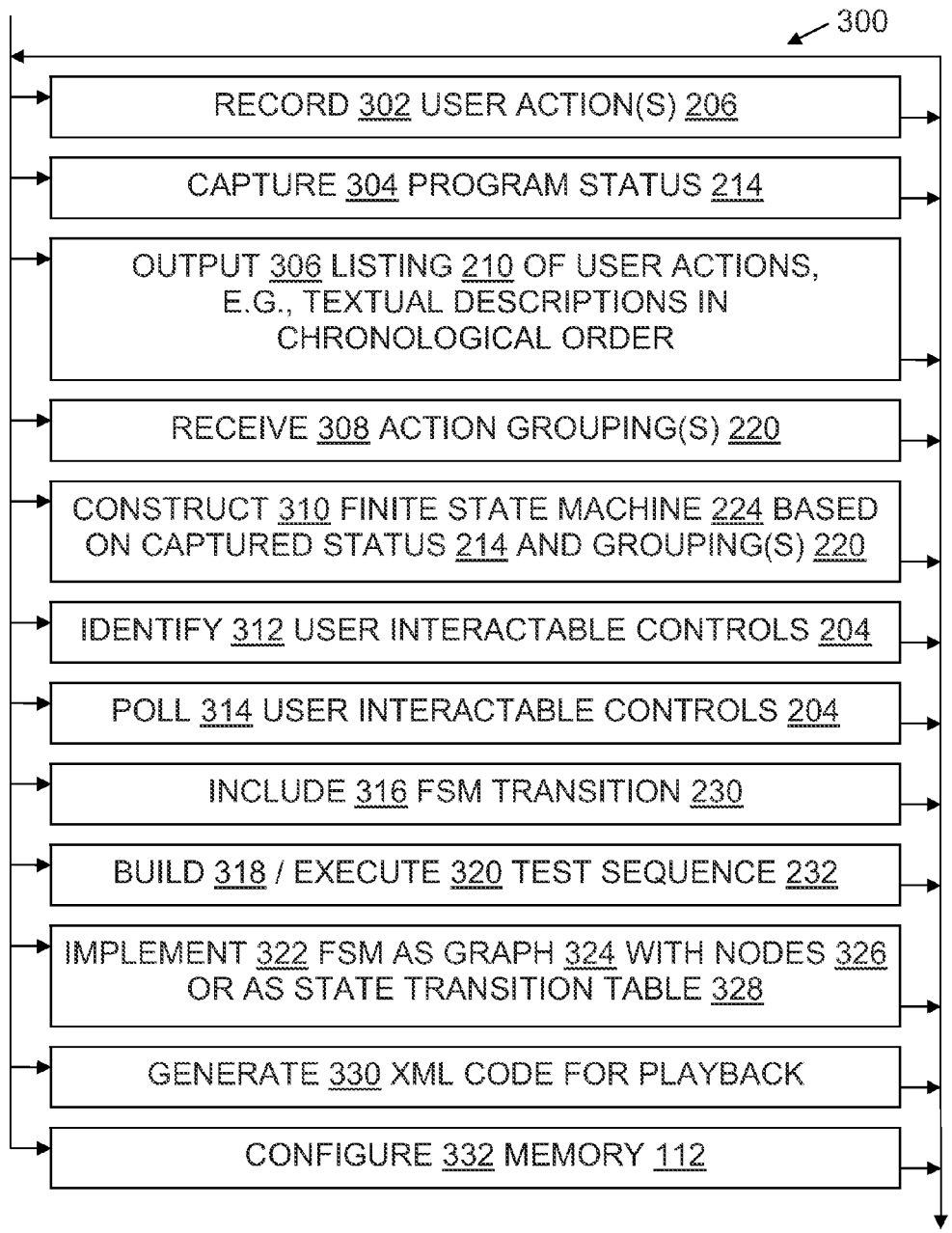
FIG. 3 is a flow chart illustrating steps of some method and configured storage medium embodiments.

With reference to FIGS. 1 through 3, some embodiments provide a computer system 102 with a logical processor 110 and a memory medium 112 configured by circuitry, firmware, and/or software for transforming user actions within an application 120 or other program into a testing automation finite state machine. A test sequencer 202 configures the memory in operable communication with the logical processor. In some embodiments, the test sequencer has an action 206 recording component such as a recorder 208 configured for recording user actions taken as a user interacts with the program through user interface hardware 128. The test sequencer 202 also has a status capturing component such as a capturer 216 configured for capturing user interface status 214 information before and after the recorded user actions 206. The test sequencer 202 also has an action grouping component such as a receiver 218 configured for specifying user action groups 222, and an FSM constructing component such as constructor 226 configured for constructing a finite state machine 224 having states 228 which correspond to user action groups 222. The various components may be implemented as hardware (memory, processor, peripherals, etc.) configured by software to operate as discussed herein. The program to be tested includes user interface software 126 for performing user I/O through the user interface hardware 128.

The finite state machine 224 may be implemented using a graph with linked nodes, or a state transition table, for instance. The finite state machine 224 may encode sequences not manually entered, and in particular may encode undesirable program behaviors not previously known to a tester. For instance, in some cases the finite state machine 224 contains a sequence of states linked by transitions, in which a user action to exit the program being tested is followed by additional user action in the program without an intervening user action to re-enter the program.

In some embodiments, the action recording component is configured to record a sequence of user actions 206 and to automatically generate XML 238 code which can be played back by the player 236 to repeat the sequence. In some embodiments, the builder 234 outputs test sequences in XML which can be played by the player 236 to exercise the application program being tested. Thus, the memory 112 may be configured by a recorded sequence of user actions and also by an automatically generated test sequence 232 which contains the user actions in a different order than the recorded sequence.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

FIG. 3 illustrates some method embodiments in a flowchart 300. Methods shown in the Figures may be performed in some embodiments automatically, e.g., by a test sequencer 202 and/or by particular test sequencer component(s) under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an action recording step 302, an embodiment records user action(s) 206 during user interaction with an application program being tested.

During a status capturing step 304, an embodiment captures user interface control 204 status 214 during user interaction with an application program being tested.

During an action listing outputting step 306, an embodiment outputs a human-readable listing 210 of user action(s) 206 recorded during user interaction with an application program being tested. For example, the listing 210 may recite textual descriptions of user actions, in their chronological order during the user interaction with the application 120 being tested.

During an action grouping receiving step 308, an embodiment receives user-defined groupings 220 of user action(s) 206, with one or more user action per group 222. In some cases, some user actions are not placed in any group, e.g., a "return to home page" action might not be grouped.

During an FSM constructing step 310, an embodiment constructs a finite state machine 224 based on the captured control status 214 and the user-defined action groupings 220.

During a control identifying step 312, an embodiment identifies user interactable controls 204 of the application 120 being tested.

During a control polling step 314, an embodiment polls user interactable controls 204 of the application 120 being tested, to obtain status 214 information. Step 314 may be part of status capturing step 304.

During a transition including step 316, an embodiment includes a transition 230 in a finite state machine 224. Step 316 may be part of FSM constructing step 310.

During a test sequence building step 318, an embodiment builds a test sequence 232 from the finite state machine 224.

During a test sequence executing step 320, an embodiment executes a test sequence 232, thereby exercising the application 120 being tested.

During an FSM implementing step 322, an embodiment implements a finite state machine 224 as a graph 324 with nodes 326, and/or as a state transition table 328. Step 322 may be part of FSM constructing step 310.

During an XML generating step 330, an embodiment generates XML code for a recorded sequence and/or for a test sequence.

During a memory configuring step 332, a memory 112 is configured by a test sequencer 202, an action grouping 220, a test sequence 232, or otherwise in connection with automatic generation of a state graph modeling a system's behavior as discussed herein.

The foregoing steps and their interrelationships are discussed in greater detail below, in connection with various embodiments.

Some embodiments provide a method for transforming user actions within an application 120 or other program into a testing automation finite state machine. The method includes automatically recording 302 user actions taken as a user interacts with the program through user interface hardware. The method also includes automatically capturing 304 program status information before and after the user actions, and outputting 306 in human-readable form a listing of the recorded user actions, e.g., as textual descriptions of actions listed in chronological order of action occurrence.

A human tester then organizes the user actions into logical groups, e.g., a user action group may be a sequence of contiguous user actions. The tester provides an action grouping 220. FIG. 4, for example, shows a listing of user actions annotated along the left hand side for an action grouping with the logical group names "login", "book ticket", and "buy a computer".

The method includes receiving an action grouping which specifies user action groups; each user action group includes at least one of the recorded user actions, but some user action(s) might be omitted from the grouping. In the example of FIG. 4, "Click Home link" is omitted from the grouping. The method also includes automatically constructing 310 a finite state machine based on the captured program status information and on the specified user action groups. The finite state machine may have states which correspond to user action groups, for instance.

In some embodiments, the method includes automatically identifying 312 a set of interactable controls of a user interface portion of the program, after which the method captures 304 program status information from the interactable controls 204. In some embodiments, the method automatically captures program status information before and after the user actions by polling interactable controls 204 of a user interface.

In some embodiments, the method constructs 310 a finite state machine in part by including 316 in the finite state machine a transition from a state corresponding to a user action group alpha to a state corresponding to a user action group beta when the program status information captured before performance of user action group beta is a subset of the program status information captured after performance of user action group alpha. In some embodiments, the finite state machine includes 316 a transition from a state corresponding to a user action group alpha to a state corresponding to a user action group beta when the status information captured after performance of user action group alpha is the same as the status information captured before performance of user action group beta. In some embodiments, the finite state machine includes 316 a transition to a state corresponding to user action group based on program status information for a proper subset of all interactable controls of the program which are available to the user upon commencing the user actions corresponding to the state.

In some embodiments, the method includes automatically building 318 a test sequence based on the finite state machine, e.g., a test sequence of user actions in the form of state transitions of the finite state machine. The test sequence is configured to exercise the application 120 or other program being tested, by performing user action test sequences which depart from the recorded sequence used to construct the finite state machine. For instance, a test sequence may include a user action to logout of the program followed by additional user action in the program without an intervening user action to log back into the program, even though the recorded sequence ended with a logout. In some embodiments, the method automatically builds test sequences which collectively traverse every transition of the finite state machine at least once. In some embodiments, the method also includes automatically executing 320 the test sequence.

Configured Media

Some embodiments include a configured computer-readable storage medium 112. Medium 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as test sequencer components, in the form of data 118 and instructions 116, read from a removable medium 114 and/or another source such as a network connection, to form a configured medium. The configured medium 112 is capable of causing a computer system to perform method steps for transforming a recorded sequence of user actions into a collection of test sequences as disclosed herein. FIGS. 1 through 3 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Testing of a GUI application 120 may include driving the application through defined user scenarios, testing their functionality, verifying the outcome of action(s) in the scenario and then checking for the state of the application under test before and after performing the user scenario. UI testing is often manual, due to the overhead associated with UI automation. Manual testers generally test the application for the expected scenarios, namely, scenarios in which the product specification anticipates the user will use the product. These expected scenarios are sometimes referred to in testing as "happy" scenarios. Testing may also include some negative scenarios that test how the application behaves if the interaction does not go as expected.

However, testing in this manner is often tedious, error-prone, and inconsistent. The control flows possible in the application will usually be much more than what the specification defines as expected scenarios. Bugs in these numerous control flows can be a source of dissatisfaction, making it better for the test team to find these bugs than the end user.

Some embodiments described herein address these challenges by generating a state model of an application automatically to ensure all paths can be generated and tested, and by automatically executing different paths through the state model with little or no extra work by a tester. This is implemented by capturing state of the application at every logical action and constructing a finite state machine mirroring the flow of the scenario and the state of the system. With this model, the test sequencer 202 tool generates all valid workflows that could result as a permutation of the actions performed on the state model.

Figure 6:
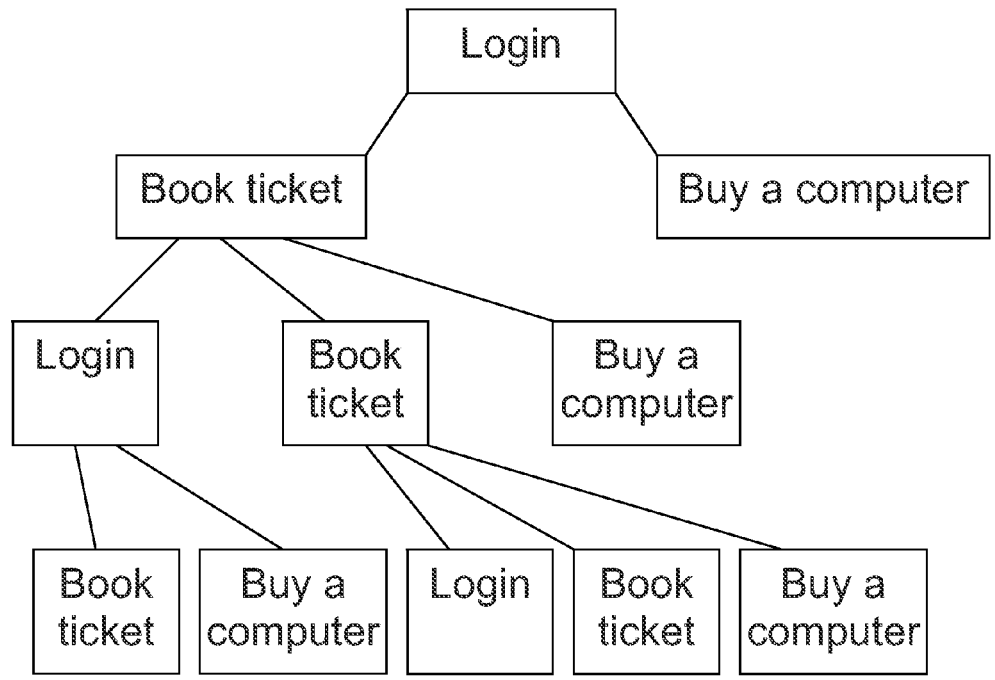
FIG. 6 is a graph representation of a finite state machine and corresponding test sequences, continuing the example of FIGS. 4 and 5.
Figure 7:
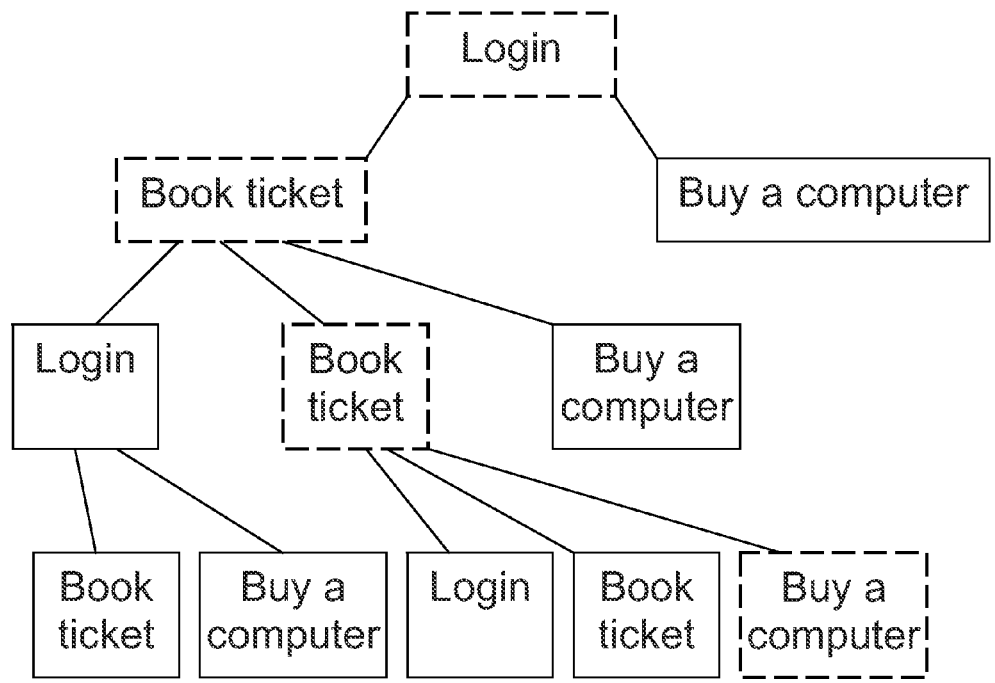
FIG. 7 is an instance of the FIG. 6 graph, with a particular test sequence highlighted.

As an example, and with regard to basic user flow, assume we are doing scenario testing of a website for which possible actions include ordering a computer and booking a ticket from an Employee page. During testing, a manual tester executes one whole scenario in the application 120. The tester's actions in this scenario are recorded 302 as individual actions and output 306 as a human readable text file. The tester can then divide these into logical groups like login, logout, buy book, order computer, and so on; see FIG. 4. At the beginning and end of each logical action, a snapshot of the system status 214 is taken; see FIG. 5. The snapshots allow the test sequencer 202 to determine system 102 state before and after user actions. Then a state machine is constructed 310 using the states computed, and the entire state graph is displayed; see FIG. 6. The tester can pick any path to traverse in the graph and that test sequence is automatically executed using the automation already recorded 302. FIG. 7 shows one such path, with a corresponding test sequence for logging in, booking a ticket, booking a ticket, and buying a computer.

In some embodiments, a test sequencer 202 includes the following components: a State-Capture framework (with, e.g. capturer 216), a State graph constructed with all possible valid actions (with, e.g., finite state machine 224), and an Execution engine for traversing the state graph (with, e.g., player 236).

With regard to the State Capture framework, if I perform action "A" on a given application 120, the state capture framework captures the state of the application before and after the action "A". For instance if the application to test is a word processor application and the action I perform is "Open Document X", then the initial state of the application would have been "Empty" and the final state would have been "Loaded with document X" since the document X would have opened in the word processor after action "A".

In some embodiments, the State Capture framework is implemented using the managed API layer provided by Microsoft's Visual Studio® Team Test solution as part of the Dev10 release. The test sequencer 202 tool first analyzes the application 120 and identifies 312 a set of controls 204 that the user can interact with. These controls are polled 314 before and after any given action 206 is performed and their properties are recorded in a snapshot. Thus we obtain a list of actions and the corresponding states before and after each of these actions.

In order to perform an action "B" after action "A", we may ensure that the end state of the application after performing A is the same as the required start-state of "A". These states are captured as status 214 information when the manual tester has tested the application for the basic control flow which involves both actions "A" and "B". For instance, consider a form used to create a new email account:

1. The Submit button is enabled only if the ID is filled
2. User can submit form only if Submit button is enabled If you consider two actions such as:

1. Fill the ID
2. Submit the form

The tool is able to determine that action 2 always has to follow action 1 since the start state of action 2 mandates the end state of action 1.

Accordingly, in some embodiments whenever the tester does a logical action the tool captures the state of the all the user interactable controls, such as textbox, hyperlink, checkbox, radio button and other controls 204. The set of captured controls can be configurable according to the UI framework the application is built in. The start state does not necessarily have states of all interactable controls; instead it may list only the states of the controls that are actually been acted upon in action X.

Thus, in some embodiments when we try to find whether a logicalAction 'X' can follow a logicalAction 'Y' we compare the state of the controls in the logical action 'X' with its state after logicalAction 'Y'. We find that if all controls in the logicalAction 'X' have the start state matching the end State of logicalAction 'Y', then logicalAction 'X' can follow logical Action 'Y'. An example is shown in the following table:

| End State of LogicalAction Y | Start State of LogicalAction X |
|---|---|
| submitButton - Enabled | FeedBack Hyperlink - Disabled |
| Logout HyperLink - Enabled | submitButton - Enabled |
| UserName textbox - Disabled | Logout HyperLink - Enabled |

When the basic control flow is being tested by the manual tester, the tester can combine raw user actions into logical action group(s) and when this grouping is input, the test sequencer 202 tool will automatically capture the start and end state of each and every logical action group. If a typical user scenario consists of many logical action groups 222, the tool will capture the list of all start and end states of each of the logical action groups.

With respect to the State graph, testing the application thoroughly need not mean that we test all the possible combinations. If the application 120 under test has five possible actions that can be done on it, then we may end up testing all one hundred and twenty canonical combinations. But in some embodiments the test sequencer 202 tool reduces the testing space by maintaining the state information.

Consider an example, in which a website www dot example dot com is to be tested. We obtain the following logical action grouping 220:

1. Open Internet Explorer and browse to www dot example dot corn
2. Sign in→Enter the mail in username textbox; Enter password; Click Sign in Button
3. Browse the site for applications→Click on the applications
4. Sign Out→Click on Logout link From the above steps, the test sequencer 202 tool has captured the start and end state of the each of the logical actions, which we denote S1-S4 and E1-E4, respectively. The recorded sequence of user tested logical flow is (1) Launch app-(2) Login-(3) Browse site-(4) Logout. Based on the state info (captured status 214) the tool will generate all logical combinations, such as:

1. (1) Launch app-(2) Login-(3) Browse site-(4) Logout-(1) Launch app-(2) Login
   [Because the Start state of (2) Login and End state of (1) Launch app]
2. (1) Launch app-(2) Login-(2) Login-(3) Browse site-(4) Logout
   [Because the Start state of (2) Login is same as its End State]

and so on.

From a test sequence 232, we are able to test the fact that the user was able to logout. But if any of the actions in the sequence fails, then we have a bug in the website. For instance, when the test sequence [(1) Launch app-(2) Login-(3) Browse site-(4) Logout-(3) Browse site] was generated by the tool, site content could still be browsed in spite of logging out, because of a stale cookie. Thus, some embodiments of the test sequencer 202 tool expose bugs resulting from such state mismatches.

Similarly, we can test any logical sequence of actions 206 on the website by driving the application under test through a basic control flow to record the actions and capture status information, and then use the test sequencer 202 tool to test some or all of the rest of the action combinations.

With respect to the Execution engine, as the tester drives the application through one user flow manually, in some embodiments a recorder 208 in the background records each of these actions and automatically generates XML which can be played back at a later stage. This can be implemented using the record-and-play engine shipping as part of the Dev10 release of Microsoft's Visual Studio® Team Test solution, for example. Now when the state graph is constructed 310 and all valid action sequences are listed, the automation captured for each of these actions is executed, thereby creating automation sequences for all of these sequences generated. This enables the tester to explore different scenarios on the application automatically without having to perform more manual testing.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for transforming user actions within a program into a testing automation finite state machine, the method comprising the steps of:
    automatically recording user actions taken as a user interacts with the program through user interface hardware;
    automatically capturing program status information before and after the user actions;
    outputting in human-readable form a listing of the recorded user actions;
    receiving an action grouping which specifies user action groups, each user action group including at least one of the recorded user actions; and
    automatically constructing a finite state machine based on the captured program status information and on the specified user action groups, during said constructing step including in the finite state machine a transition from a state corresponding to a user action group alpha to a state corresponding to a user action group beta when the program status information captured before performance of user action group beta is a subset of the program status information captured after performance of user action group alpha.

2. The method of claim 1, further comprising automatically identifying a set of interactable controls of a user interface portion of the program.

3. The method of claim 1, wherein the step of automatically capturing program status information before and after the user actions comprises polling interactable controls of a user interface.

4. The method of claim 1, wherein the step of outputting a listing of the recorded user actions comprises outputting textual descriptions of actions listed in chronological order of occurrence.

5. The method of claim 1, wherein the step of automatically constructing a finite state machine comprises including in the finite state machine a transition to a state corresponding to user action group based on program status information for a proper subset of all interactable controls of the program which are available to the user upon commencing the user actions corresponding to the state.

6. The method of claim 1, further comprising automatically building a test sequence based on the finite state machine, the test sequence configured to exercise the program.

7. The method of claim 6, further comprising automatically executing the test sequence.

8. A computer-readable storage medium configured with data and with instructions that when executed by at least one processor causes the processor(s) to perform a method for transforming user actions within a program into a testing automation finite state machine, the method comprising the steps of:

automatically recording user actions taken as a user interacts with the program during a test scenario which exercises the program;

automatically capturing status information from a set of interactable controls of a user interface portion of the program, before and after the user actions;

receiving an action grouping which specifies user action groups, each user action group including at least one of the recorded user actions;

automatically constructing a finite state machine having states which correspond to user action groups, during said constructing step including in the finite state machine a transition from a state corresponding to a user action group alpha to a state corresponding to a user action group beta when the status information captured after performance of user action group alpha is the same as the status information captured before performance of user action group beta; and automatically building a test sequence of user actions in the form of state transitions of the finite state machine.

9. The configured medium of claim 8, further comprising outputting a listing of recorded user actions to at least one of: a display, a printer, a network, a file.

10. The configured medium of claim 8, wherein each user action group consists of a sequence of contiguous user actions.

11. The configured medium of claim 8, wherein the step of automatically building a test sequence builds a test sequence in which a user action to logout of the program is followed by additional user action in the program without an intervening user action to log back into the program.

12. The configured medium of claim 8, wherein the method automatically builds test sequences which collectively traverse every transition of the finite state machine at least once.

13. A computer system for transforming user actions within a program into a testing automation finite state machine, the system comprising:
   a logical processor;
   a memory in operable communication with the logical processor;
   user interface hardware;
   a test sequencer residing in the memory, the test sequencer having:
      an action recording component configured for automatically recording user actions taken as a user interacts with a program through the user interface hardware;
      a status capturing component configured for automatically capturing user interface status information before and after the recorded user actions;
      an action grouping component configured for specifying user action groups, each user action group including at least one of the recorded user actions; and
      an FSM constructing component configured for automatically constructing a finite state machine having states which correspond to user action groups, an automatically constructed finite state machine in the system including a transition from a state corresponding to a user action group alpha to a state corresponding to a user action group beta when the program status information captured before performance of user action group beta is a subset of the program status information captured after performance of user action group alpha;
   and
   a listing of the recorded user actions in human-readable form.

14. The system of claim 13, wherein the system further comprises a program to be tested, the program including user interface software for performing user I/O through the user interface hardware.

15. The system of claim 13, wherein the system further comprises a finite state machine having states which correspond to user action groups, the finite state machine configuring memory, the finite state machine comprising at least one of: a graph with linked nodes, a state transition table.

16. The system of claim 15, wherein the finite state machine contains a sequence of states linked by transitions, in which a user action to exit the program is followed by additional user action in the program without an intervening user action to re-enter the program.

17. The system of claim 13, wherein the action recording component is configured to record a sequence of user actions and to automatically generate XML code which can be played back to repeat the sequence.

18. The system of claim 13, wherein the memory is configured by a recorded sequence of user actions and also by an automatically generated test sequence which contains the user actions in a different order than the recorded sequence.

* * * * *